US009407520B2

(12) United States Patent
Stålnacke

(10) Patent No.: US 9,407,520 B2
(45) Date of Patent: Aug. 2, 2016

(54) METHOD AND CELL CONTROLLING NODE FOR SUPPORTING NETWORK MANAGEMENT

(75) Inventor: Per-Daniel Stålnacke, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 28 days.

(21) Appl. No.: 14/382,385

(22) PCT Filed: Mar. 16, 2012

(86) PCT No.: PCT/SE2012/050296
§ 371 (c)(1),
(2), (4) Date: Sep. 2, 2014

(87) PCT Pub. No.: WO2013/137792
PCT Pub. Date: Sep. 19, 2013

(65) Prior Publication Data
US 2015/0111503 A1    Apr. 23, 2015

(51) Int. Cl.
H04L 12/26     (2006.01)
H04W 24/10    (2009.01)
H04W 24/08    (2009.01)

(52) U.S. Cl.
CPC ............. *H04L 43/065* (2013.01); *H04W 24/10* (2013.01); *H04W 24/08* (2013.01)

(58) Field of Classification Search
None
See application file for complete search history.

(56) References Cited

U.S. PATENT DOCUMENTS

2009/0310501 A1   12/2009  Catovic et al.
2011/0028171 A1*   2/2011  Guo ..................... H04L 5/0053
                                                          455/502
2012/0135766 A1*   5/2012  Garavaglia ............ H04B 7/024
                                                          455/509

FOREIGN PATENT DOCUMENTS

WO     WO 98/23115 A1     5/1998
WO     WO 2011/150262 A1  12/2011

OTHER PUBLICATIONS

International Search Report for International Application No. PCT/SE2012/050296 mailed Dec. 17, 2012, 3 pages.
Written Opinion of the International Searching Authority for International Application No. PCT/SE2012/050296 mailed Dec. 17, 2012, 8 pages.

* cited by examiner

Primary Examiner — Alejandro Rivero
(74) Attorney, Agent, or Firm — Myers Bigel & Sibley, P.A.

(57) ABSTRACT

A method and cell controlling node providing radio communication in a first cell of a communication network, for supporting management of the communication network based on performance related reports sent to a management system. Signal measurement reports are obtained from User Equipments being served by the first cell controlling node, on measurements on signals from cell controlling nodes in neighboring cells. Based on the measurement reports, the cell controlling node identifies a neighboring cell from which signals fulfill a signal condition. A current identity of the identified neighboring cell is then selected as a cell cluster identity, in order to send performance related reports to the management system indicating the cell cluster identity. Cell cluster identity can be shared by cells forming a cell cluster of a specific area, and performance related reports can be more uniform regardless of which cell controlling nodes they are received from.

20 Claims, 3 Drawing Sheets

METHOD AND CELL CONTROLLING NODE FOR SUPPORTING NETWORK MANAGEMENT

CROSS REFERENCE TO RELATED APPLICATION

This application is a 35 U.S.C. §371 national stage application of PCT International Application No. PCT/SE2012/050296, filed on 16 Mar. 2012, the disclosure and content of which is incorporated by reference herein in its entirety. The above-referenced PCT International Application was published in the English language as International Publication No. WO 2013/137792 A1 on 19 Sep. 2013.

TECHNICAL FIELD

The present disclosure relates generally to a method and a cell controlling node in a communication network for supporting management of the communication network based on performance related reports sent from the cell controlling node to a management system used for operating the network.

BACKGROUND

Networks for wireless communication are typically surveyed and operated by means of a central management system which, depending on the standards and terminology used, may be referred to as, e.g. "Operation Support System" (OSS), "Network manager" or "Domain manager", the latter term being used by the Third Generation Partnership Project (3GPP). The general term "management system" will be used in this description to represent any system, function or centre that handles the network e.g. in terms of Operation and Maintenance (O&M). Further, the term "cell controlling node" will be used to represent any radio node in the network that can provide radio communication for User Equipments (UEs) in a cell. Depending on the standards and terminology used, the cell controlling node in this context may thus be a base station, a Node B, an evolved Node B (eNode B), a Radio Network Controller (RNC), a Radio Base Station (RBS), and so forth.

In order to monitor performance, alarms, quality and end-user experience in the network, cell controlling nodes such as base stations in the network frequently send performance related reports to the management system which may refer to e.g. measured performance data, throughput, latency, resource usage, error rates, and so forth. The management system thus generally monitors the performance in the network based on such reports in order to detect any problems and shortcomings in the network, and to correct or otherwise deal with these problems and shortcomings.

Today, the management system handles such performance related issues on a cell or base station basis which has traditionally been suitable for networks with well-defined and separated geographical areas for the cells. However, in order to meet the demands of increasingly advanced UEs and services of today, the modern networks for wireless communication are becoming more and more heterogeneous in the sense that cells of different sizes and overlapping radio coverage areas are added to the networks to meet the increasing demands. For example, in an area covered by a relatively large cell, or "macro-cell", it may be necessary to add a number of smaller cells, e.g. so-called "micro-cells", pico-cells", nano-cells and "femto-cells" to provide increased data throughput in small areas such as hotspots or the like.

An illustrative example of such a heterogeneous network for wireless communication is schematically shown in FIG. 1 where a macro-cell A provides a relatively large radio coverage area. Further, two micro-cells B and C provide more limited coverage areas within cell A, and a number of even smaller cells D-H with coverage areas within cell A, e.g. pico-cell, nano-cells or femto-cells depending on the terminology used have also been added to the network. In this example, the coverage areas of cells G and H are further overlapping with cell C as well.

For example, a UE located in a certain area may be connected to a macro-cell or alternatively to a micro-cell or femto-cell, etc., depending on how the network allocates its resources at the moment and decides which base station or cell controlling node to serve the UE. As a result, a corresponding performance related report pertaining to the UE in this area can be quite different depending on whether it is sent from a macro-cell, micro-cell or pico-cell, etc., and the evaluation of performance in a certain area may be highly dependent on which cell controlling node has provided the performance related report. It is thus a problem that the performance related reports for a certain area are different depending on which cell controlling nodes have sent the reports, and that it may be laborious in the management system to determine which reports are valid for that area particularly when the coverage of the cells and configuration in base stations and cell controlling nodes often changes.

Furthermore, a heterogeneous network for wireless communication of today may comprise a huge number of cells of different types and sizes, frequently with more or less overlapping coverage areas, where performance related reports are provided separately for each cell to the management system with different cell identities. It is also a problem that the task of evaluating the performance and finding faults can be quite complex when so many cells are involved, making great demands on the management system's capacity and resources. This problem becomes ever more accentuated when the network is changed from time to time, e.g. by adding, modifying or removing cells.

SUMMARY

It is an object of the invention to address at least some of the problems and issues outlined above. For example, it is an object to facilitate the handling of performance related reports in a communication network. It is possible to achieve these objects and others by using a method and an apparatus as defined in the attached independent claims.

According to one aspect, a method is defined in a first cell controlling node providing radio communication in a first cell of a communication network, for supporting management of the communication network based on performance related reports sent from the first cell controlling node to a management system. In this method, the first cell controlling node obtains signal measurement reports from UEs being served by the first cell controlling node, on measurements performed on signals from cell controlling nodes providing radio communication in neighbouring cells. Based on the obtained signal measurement reports, the first cell controlling node identifies a neighbouring cell from which signals as measured by the UEs according to the reports fulfill a signal condition, and selects a current identity of the identified neighbouring cell as a cell cluster identity to which the first cell is associated. The first cell controlling node then sends performance related reports to the management system indicating the selected cell cluster identity.

According to another aspect, a first cell controlling node is also defined that provides radio communication in a first cell of a communication network, the first cell controlling node being configured to support management of the communication network based on performance related reports sent from the first cell controlling node to a management system. The first cell controlling node comprises a collecting unit adapted to obtain signal measurements from UEs being served by the first base station, on transmissions from base stations providing radio communication in neighbouring cells.

The first cell controlling node also comprises a logic unit adapted to identify a neighbouring cell from which the measured signals fulfill a signal condition, based on the obtained signal measurements, and to select a current identity of the identified neighbouring cell as a cell cluster identity to which the first cell is associated. The first cell controlling node also comprises a reporting unit adapted to send performance related reports to the management system indicating the cell cluster identity of the first cell.

By using the above method and cell controlling node, it can be easier for the management system to monitor and improve performance in a certain area, irrespective of the current network configuration, since the same cell cluster identity is indicated in performance related reports from cell controlling nodes of all the cells belonging to a certain cell cluster. The number of such cell clusters will also be considerably smaller than the total number of cells in the network, which further facilitates the management.

The above method and cell controlling node may be configured and implemented according to different optional embodiments. In some possible embodiments, the signal condition may dictate that signals from the neighbouring cell have been detected by at least a certain percentage of the UEs, or that a measured signal strength from the neighbouring cell exceeds a minimum level.

In another possible embodiment, the identity of the identified neighbouring cell is selected as the cell cluster identity when the identified neighbouring cell further fulfills a cell type condition. The cell type condition may dictate that the identified neighbouring cell should not be a micro-cell nor a pico-cell if the first cell is a macro-cell, and that the identified neighbouring cell should not be a pico-cell if the first cell is a micro-cell.

The current identity of the identified neighbouring cell may have been configured in the first cell controlling node to define a handover relation with the candidate neighbouring cell. The current identity of the identified neighbouring cell may e.g. refer to any of a Cell Global Identity (CGI), a Physical Cell Identity (PCI), and a logical name. Further, the cell cluster identity may replace an original identity of the first cell for the performance related reports.

The first cell controlling node may further send a notification to cell controlling nodes serving the neighbouring cells, informing that the first cell controlling node has changed its identity to the cell cluster identity. In a similar manner, the first cell controlling node may receive a notification from the identified neighbouring cell, informing that the identified neighbouring cell has changed its identity to a new cell cluster identity. Thereby, the first cell controlling node is able to update the cell cluster identity of the first cell according to the notification.

In further possible embodiments, the performance related reports may include the cell cluster identity or a representation thereof. If the first cell controlling node is shut down for a period of time, it may send an update request for current identities of the neighbouring cells to cell controlling nodes serving the neighbouring cells, after the first cell controlling node has been restarted, to determine if it is necessary to update the cell cluster identity of the first cell.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1:
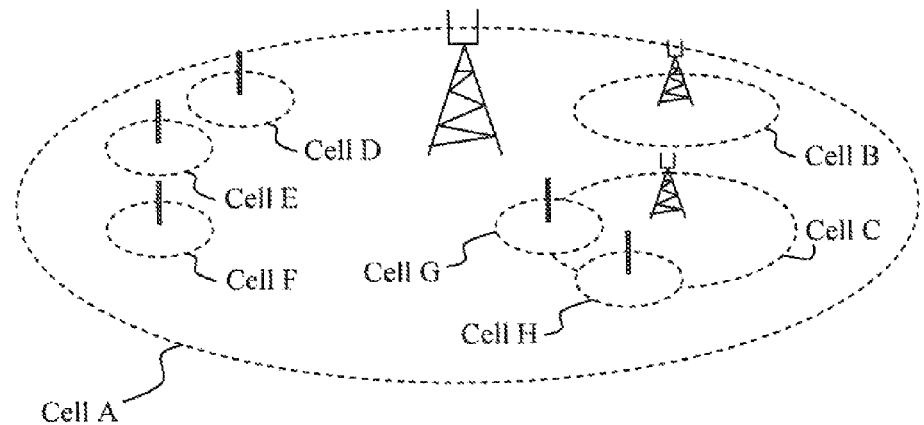
FIG. 1 is an example view of a network scenario with multiple cells of different sizes and types, according to the prior art.

Briefly described, a solution is provided to facilitate the evaluation of performance in a network for wireless communication by introducing a new attribute in the performance related reports denoted "cell cluster identity" which is shared by several adjacent and/or overlapping cells in a certain geographical area. For example, a cell identity used for a relatively large cell may also be used in performance related reports for other smaller cells located more or less in the same area, e.g. when having coverage areas which overlap with the larger cell's coverage area. This solution provides a way of how a cell controlling node, e.g. a base station or an RNC, can determine and automatically select a suitable cell cluster identity for use in its performance related reports to a management system, where the cell cluster identity is thus common for a cluster of two or more cells including the cell served by the cell controlling node.

For example, a UE located in a certain area may be connected to a macro-cell with a distributed antenna system or alternatively to a micro-cell or pico-cell, etc. That is, the antenna locations can be the same in these scenarios and the radio environment can be the same, but the reporting is conventionally done differently from different cell controlling nodes for this area depending on the configuration of resources. In this solution however, the performance related reports will indicate the same cell duster identity when the cells of this area have selected to use that cell cluster identity by employing the solution, which will be described in more detail later below.

It is an advantage that this solution makes it easier to monitor and improve the performance in a certain area, irrespective of the current network configuration, and to identify the cause of a detected bad performance, e.g. due to a bad performing pico Node or some problem with a part of a macro Node. The same cell cluster identity is thus indicated in performance related reports sent to the management system from cell controlling nodes of all the cells belonging to a certain cell cluster, which facilitates the handling and evaluation of the reports since they uniformly relate to the same area, i.e. the cell cluster. Another advantage is that the number of such cell clusters will also be considerably smaller than the total number of cells in the network, which further facilitates the management. The management system can then use a cell cluster view based on cell cluster identities when managing the network, instead of the more ambiguous conventional cell or base station view.

In this description, the term "cell cluster identity" is used to represent any name or identification which identifies a cell in the cluster. The cell cluster identity could also identify a cell controlling node such as a base station providing radio communication in a cell of the cell cluster and a base station identity could just as well be used as the cell cluster identity. Throughout the following description, the term "cell identity" is generally used even though a base station identity can be used in practice to indicate a cell and represent a cell identity. Thus, either of the terms "cell cluster identity" and "base station identity" can be applied when describing this solution. The cell cluster identity described here could also be called a "logical cell identity" to indicate that it is typically shared by at least two cells.

Figure 2:
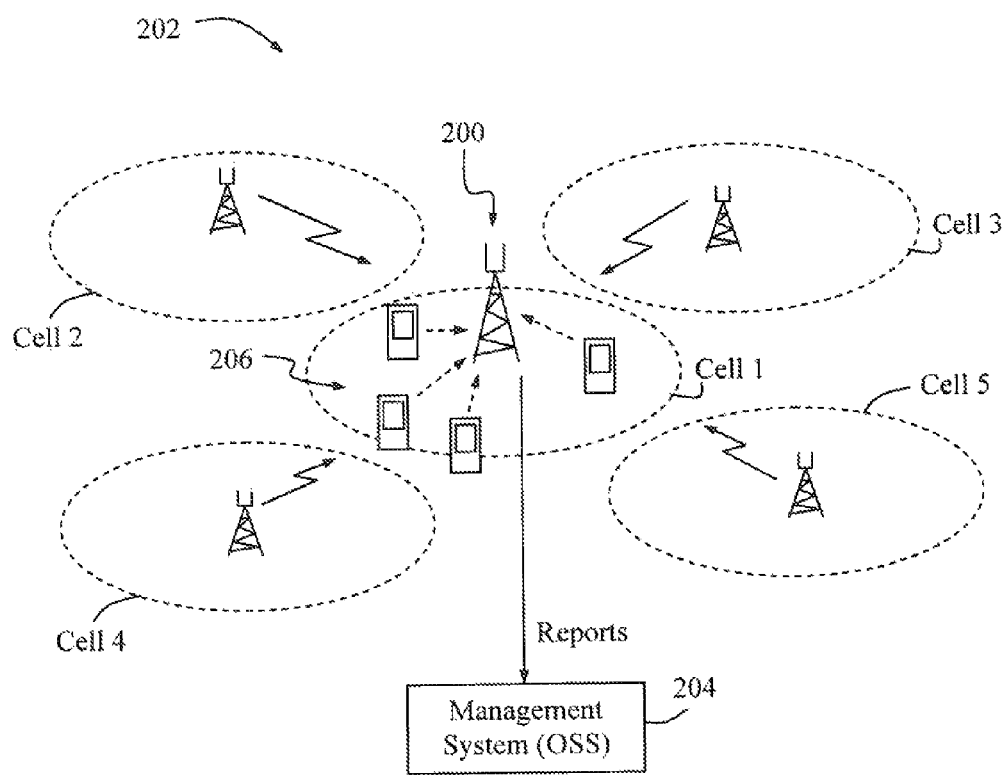
FIG. 2 is a an example view of a network scenario when the solution is employed, according to some possible embodiments.

FIG. 2 illustrates a communication scenario where this solution can be employed. A first cell controlling node 200, in this example illustrated as a base station, provides radio communication in a cell denoted "Cell 1" which is comprised in a network 202 for wireless communication. Cell 1 has a number of neighbouring cells denoted "Cell 2-Cell 5", each being served by a corresponding base station, i.e. cell controlling node, as shown in the figure. Signals transmitted from the base stations in the neighbouring Cells 2-5 may typically be detected in Cell 1 as well. The first cell controlling node 200 is obliged to send performance related reports, e.g. according to a certain scheme or the like, to a management system 204 which may be an OSS node or similar. In these reports, the cell controlling node 200 conventionally uses the so-called "Full Distinguished Name" (FDN) referring to the entity managed by the cell controlling node 200. For example, if some cell related performance data shall be reported, the FDN of the cell is typically used in conventional procedures. The FDN uniquely identifies the cell within the managed network, i.e. the network managed by management system 204.

In this example, four neighbouring cells are shown although it can be understood that this solution can be employed for any number of neighbouring cells from which signals may be detected in the cell of the first cell controlling node.

In Cell 1, a plurality of UEs 206 are connected to the cell controlling node 200, either being in idle state when "camping" in the cell or in active state when communicating data or messages with the cell controlling node 200. According to regular procedures, the UEs 206 are configured to perform measurements on signals from the base stations in the neighbouring cells 2-5 and to send signal measurement reports to their serving cell controlling node 200, as indicated by dashed arrows from the UEs, to provide a basis for decisions regarding handover and cell reselection, which is well-known in the art. This existing measuring and reporting mechanism in UEs can be utilized also in this solution as follows.

As described above, this solution teaches that a cell cluster identity common for a cluster of cells is indicated in performance related reports sent from the cell controlling nodes of the cells to a management system, to facilitate the handling and evaluation of the reports since they uniformly refer to the same joint area. A procedure of how a first cell controlling node, such as the cell controlling node 200 in FIG. 2, can determine and automatically select a suitable cell cluster identity to use in performance related reports, will be described below with reference to the flow chart in FIG. 3.

First, a conventional procedure for creating handover relations will be described. In a cellular system where handover is employed, the handover takes place between cells controlled by base stations, or more generally by cell controlling nodes. To enable handover of UEs between two cells, a handover relation "from cell"-"to cell" must be defined in the "from cells" nodes, i.e. base stations or cell controlling nodes. The establishment of the handover relations can either be done manually based on input from some planning tools, drive tests, etc. or from some more advanced functionality such as the so-called "Automatic Neighbour Relation" (ANR) used in LTE, where base stations can automatically find their neighbour relations, and also remove any redundant or unnecessary handover relations. In this context, information may be conveyed e.g. over the so-called "X2" interface employed between base stations in LTE networks. Alternatively, distribution of cell identities of neighboring cells and controlling node identities to the "from cell" controlling node may be controlled by the management system.

When adding a new handover relation, the "to cell" and its cell controlling node (base station, BSC, etc.) must be defined in the controlling node of the "from cell". In the case when handover relations are handled by the management system, the names, e.g. FDNs, of the "to cell" and its controlling node are normally identical with the one defined in the management system. In the case of ANR, the names can be constructed by using the Cell Global Identity (CGI), or a part thereof, of the "to cell".

The above procedure for creating handover relations is thus known and regularly used in networks. In the new solution described herein, the attribute "cell cluster identity" is introduced, which will identify an area in which the cell is located, typically comprising two or more cells, hence a cell cluster. The cell cluster identity could also be referred to as "cluster ID" for short in the following examples. Initially, an original identity of a cell is used in reports from the cell's cell controlling node and the cell cluster identity and the original identity, e.g. FDN, of the cell are identical, but the cell cluster identity may be updated by using the solution described herein. The cell cluster identity of a certain cell is known by the cells having handover relations to the cell. When defining a new handover relation, the cell cluster identity for the "to cell" shall be set in the "from cell", either by the management system or directly by the network, e.g. in the LTE case by X2 signaling.

Figure 3:
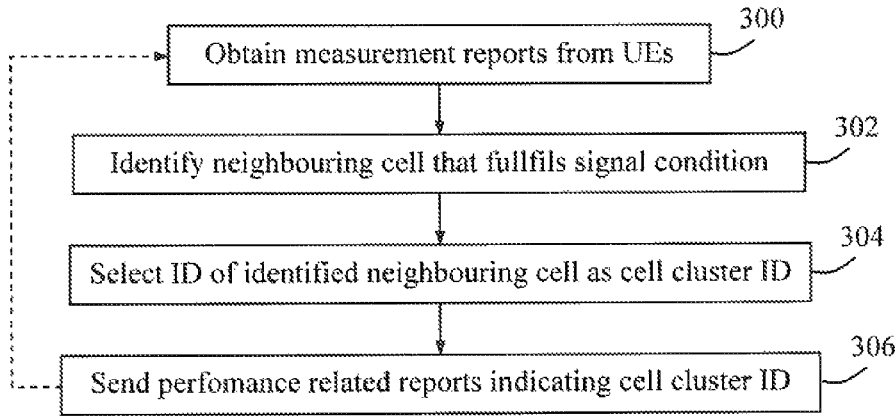
FIG. 3 is a flow chart illustrating a procedure in a cell con rolling node, according to further possible embodiments.

FIG. 3 thus illustrates a procedure in the first cell controlling node, when providing radio communication in a first cell of a communication network, for supporting management of the communication network based on performance related reports sent from the first cell controlling node to a management system. In a first shown action 300, the first cell controlling node, e.g. the cell controlling node or base station 200 in FIG. 2, obtains signal measurement reports from UEs being served by the first cell controlling node, on measurements performed on signals from base stations providing radio communication in neighbouring cells, e.g. the Cells 2-5 in FIG. 2.

The above measurements are performed over a period of time which may be selected to provide a useful and reliable basis for the following actions, which could be of a suitable length such as a few days, although the solution is not limited in this respect. For example, the obtained signal measurement reports may refer to periodic, measurements e.g. in the range of 30 minutes to a few hours each, which are repeated with a frequency in the range of, say, once a day to once every ten days. The selection of measurement periods may also be dependent on the amount of traffic, and should preferably provide a statistically significant basis for this solution. It should be noted that signal measurement reports may be obtained from the UEs according to any conventional procedure as such, e.g. used anyway for handover and cell reselection decisions. However, the measurement reports may be triggered according to a predefined scheme, as described above, e.g. to obtain measurements over the whole cell. The measuring scheme may be selected to avoid causing too much load, e.g. when traffic of calls is normally dense in the cell, while still getting sufficient and statistically significant data.

The first cell controlling node then identifies, based on the obtained signal measurement reports, a neighbouring cell from which signals as measured by the UEs according to the signal measurement reports fulfill a signal condition, in a next action 302. In this solution, the signal condition may be defined in different possible ways, without limitation. For example, the signal condition may dictate that signals from the neighbouring cell have been detected by at least a certain percentage of the UEs, e.g. 50%, and/or that a measured signal strength from the neighbouring cell exceeds a minimum level, and so forth. The signal condition may basically be defined in any suitable manner such that the detection of signals from the neighbouring cell, according to the obtained signal measurement reports, should imply that the neighbouring cell provides "strong enough" signals in the first cell when the signal condition is fulfilled.

In a following action 304, the first cell controlling node selects a current identity of the identified neighbouring cell as a cell cluster identity to which the first cell is associated. The identity of the identified neighbouring cell may be selected as the cell cluster identity when the identified neighbouring cell further fulfills a type condition, which will be explained later when describing FIG. 3a. The current identity of the identified neighbouring cell may have been pre-configured in the first cell controlling node to define a handover relation with the candidate neighbouring cell, which is a well-known procedure as such and somewhat outside the scope of this solution. Further, the current identity of the identified neighbouring cell may be the cell's original identity or a cluster identity which has been previously adopted for the neighbouring cell in a similar manner for use in performance related reports. An example of how original and adopted identities can be used in this solution will be described later on with reference to FIGS. 4 and 5.

Returning to the procedure of FIG. 3, depending on the implementation or standard used, a cell identity in this context may be e.g. a Cell Global Identity (CGI), a Physical Cell Identity (PCI), or some predefined logical name of the cell. In this solution, the current identity of the identified neighbouring cell may refer to any of the above example identities although the solution is not limited thereto. It is further assumed in the procedure of FIG. 3 that the current identities of the neighbouring cells are already known in the first cell controlling node, e.g. according to any of the above known mechanisms.

A final shown action 306 illustrates schematically that the first cell controlling node sends one or more performance related reports to the management system indicating the above selected cell cluster identity. In practice, this may be done such that the performance related reports include the cell cluster identity or a representation thereof. The performance related reports may still include the original cell or base station identity as well to identify which cell controlling node has sent the reports. A dashed arrow back to action 300 indicates that actions 300-306 may be repeated after a while, e.g. a regular intervals, in order to update the cell cluster identity which may be motivated if the radio conditions have changed or if the network configuration has been changed, and so forth.

Before the identity of the identified neighbouring cell is selected as the cell cluster identity, the first cell controlling node may use its own original cell identity alone, e.g. the FDN, or some reference thereto, in its performance related reports to the management system. In this case, the cell cluster identity may replace the original identity of the first cell for the performance related reports. It is also possible that both the cell cluster identity and the original cell identity are indicated in the performance related reports, as mentioned above. In the performance related reports, the selected cell cluster identity may be indicated by the complete cell cluster identity or by a representation thereof, e.g. just a part of the complete original cell identity and/or cell cluster identity by which the receiving management system is able to distinguish the cell cluster which the performance measurements relate to.

According to some optional embodiments, the first cell controlling node may further send a notification to the cell controlling nodes, e.g. base stations, serving the neighbouring cells, the notification informing that the first cell controlling node has started to adopt the cell cluster identity in its performance related reports. Thereby, any neighbouring cell that has identified the first cell in the above manner, i.e. based on signal measurement reports likewise obtained from UEs, and uses the cell identity of the first cell as a cell cluster identity in its own performance related reports, is able to update its cell cluster identity to be the same as the one used by the first cell controlling node, according to the sent notification. In an LTE network, such notifications can be sent between cell controlling nodes using the X2 interface.

On the other hand, the first cell controlling node may receive a corresponding notification from the cell controlling node of the identified neighbouring cell, e.g. over the X2 interface, informing that the identified neighbouring cell has changed its identity to a new cell duster identity. In that case, the first cell controlling node is able to update the cell cluster identity of the first cell according to the received notification. This mechanism of updating the cell cluster identity when receiving a notification according to the above examples, can be used to ensure that all cell controlling nodes of a certain cell cluster will use the same cell cluster identity.

Sometimes, a cell controlling node or base station may need to be shut down for a period of time and then restarted, e.g. for installing new or updated software and/or configuration data in the cell controlling node, such that the cell controlling node remains inactive during this time period. If the cell cluster identity of a neighbouring cell that has previously been selected according to the above procedure is changed in the neighbouring cell during the inactive time period, a notification thereof will not be received and processed by the first cell controlling node. However, the cell cluster identity of the first cell should also be updated accordingly in this case. To handle this situation, the first cell controlling node may send an update request for current identities of the neighbouring cells to the cell controlling nodes serving the neighbouring cells, after the first cell controlling node has been restarted, to determine if it is necessary to update the cell cluster identity of the first cell.

Figure 3A:
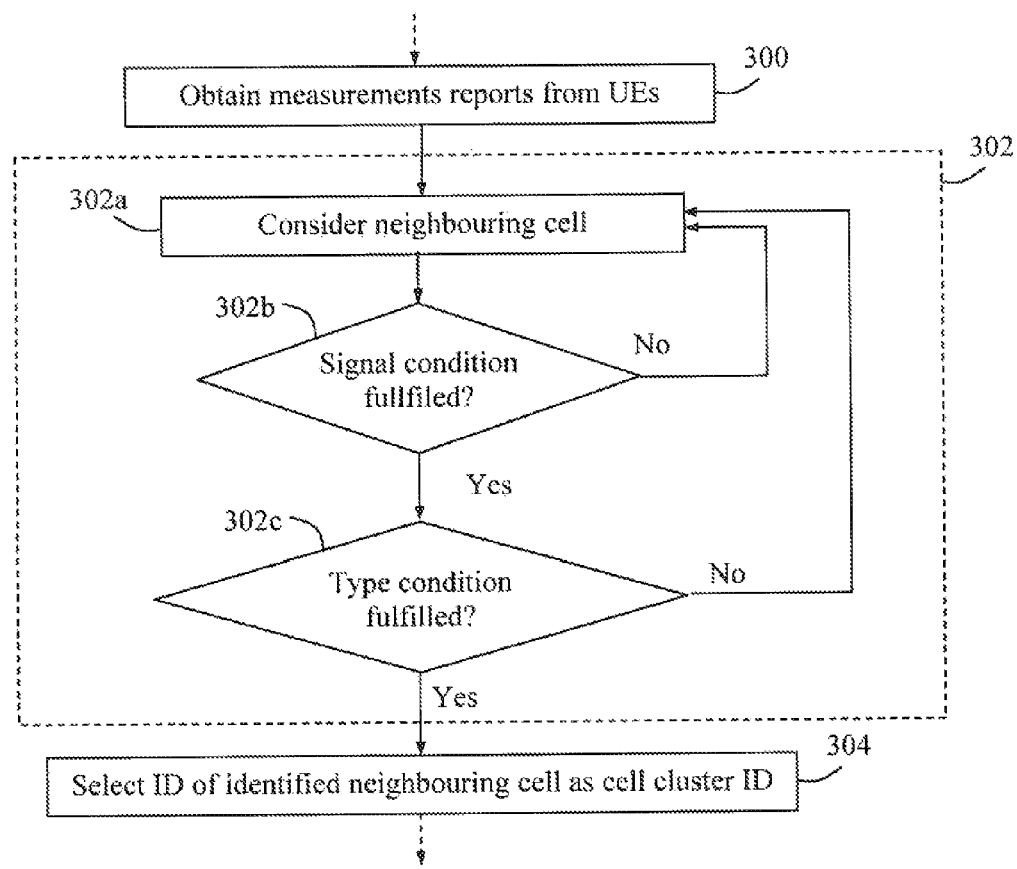
FIG. 3a is a flow chart illustrating how action 304 in FIG. 3 can be implemented in more detail, according to further possible embodiments.

FIG. 3a illustrates in more detail how the above action 302 of identifying a neighbouring cell that fulfills the signal condition can be performed by the first cell controlling node.

After the action 300 of obtaining the measurement reports from UEs, the neighbouring cells can be considered one by one, e.g. according to a preset scheme. Accordingly, an action 302a illustrates that one of the neighbouring cells is first considered for evaluation in view of adopting its current identity as a cell cluster identity or not.

Another action 302b illustrates that the first cell controlling node determines whether the signal condition is fulfilled according to the obtained measurement reports on signals measured by the UEs of the considered neighbouring cell. If the signal condition is not fulfilled in action 302b, the next neighbouring cell is considered by returning to action 302a. If the signal condition is fulfilled in action 302b, the first cell controlling node proceeds to determine whether a cell type condition is fulfilled by the considered neighbouring cell, in an action 302c. The cell type condition basically dictates that the identified neighbouring cell should not be a micro cell nor a pico cell if the first cell is a macro-cell, and that the identified neighbouring cell should not be a pico-cell if the first cell is a micro-cell. In this condition, the term "pico-cell" is used to also represent any relatively small-sized cells such as nano-cells and femto-cells, depending on the terminology used. An example of applying this condition will be described later on with reference to FIGS. 4 and 5.

If this cell type is not fulfilled by the considered neighbouring cell in action 302c, the next neighbouring cell is considered by returning to action 302a. On the other hand, if the cell type condition is fulfilled by the considered neighbouring cell in action 302c, the first cell controlling node proceeds to the action 304 of selecting the current identity of that neighbouring cell as a cell cluster identity to which the first cell is associated, and so forth.

Figure 4:
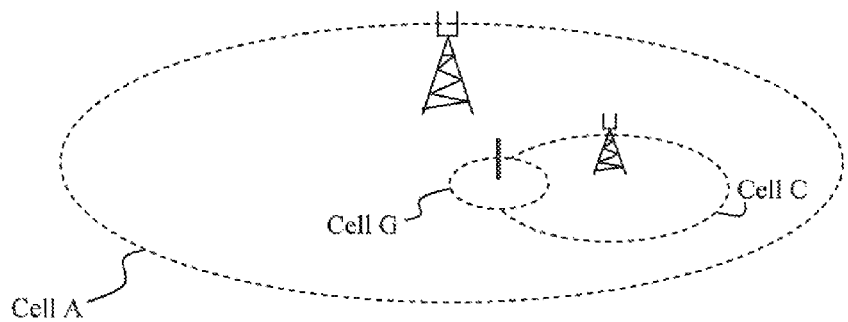
FIG. 4 is a another example view of a network scenario involving three cells where the solution can be employed.
Figure 5:
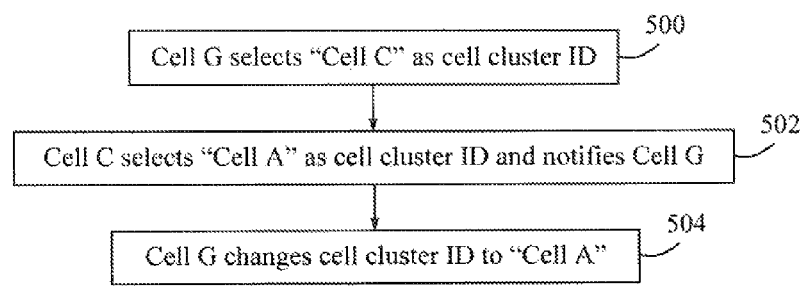
FIG. 5 is a flow chart illustrating schematically how the base stations in FIG. 4 may determine their cell cluster identities when the solution is employed, according a possible example.

An example of how the solution may be used in practice when the above cell type condition is applied, will now be described with reference to FIGS. 4 and 5. This example is quite simplified by involving just three cells, although it can be understood that an analogous procedure can be applied also for other cell configurations e.g. when a greater number of cells are involved. FIG. 4 illustrates three mutually neighbouring cells of different types: a macro-cell A having an original cell identity "Cell A", a micro-cell C having an original cell identity "Cell C", and a pico-cell G having an original cell identity "Cell G". FIG. 5 illustrates how these cells can select and adopt cell cluster identities in their performance related reports by employing this solution as follows. It is assumed that base stations serving cells A, C and G initially use their respective original cell or base station identities in their performance related reports.

In a first shown action 500, the base station of pico-cell G basically performs the procedure of FIGS. 3, 3a and as a result selects the current identity "Cell C" of micro-cell C as a cluster cell identity for use in performance related reports, since cell C fulfills both the conditions in actions 302b and 302c according to signal measurements made by UEs in cell G. In a similar manner, the base station of micro-cell C selects the current identity "Cell A" of macro-cell A, in a next action 502, as its cluster cell identity for use in performance related reports having found that cell A fulfills both the conditions in actions 302b and 302c according to signal measurements from UEs in cell C. In addition, the base station of micro-cell C sends a notification to the base stations of cells A and G, informing that it has selected the cell cluster identity "Cell A".

When the base station of pico-cell G receives this notification, it changes its cluster cell identity from "Cell C" to "Cell A" which is now used for the previously identified neighbouring cell C, in another action 504. It should be noted that the base station of cell A will keep using its original cell identity "Cell A" as cell cluster identity since none of its neighbours C and G fulfills the cell type condition of action 302c. The base station of cell A will therefore also ignore the above notification from cell C since it is not using the identity of cell C as cell cluster identity. All in all, the above procedure of FIG. 5 results in that all base stations of cells A, C and G will use the same cell cluster identity of "Cell A" in their performance related reports, thus providing a common basis and unified view for handling and evaluating all performance related reports from the cluster of cells A, C and G in the management system.

Figure 6:
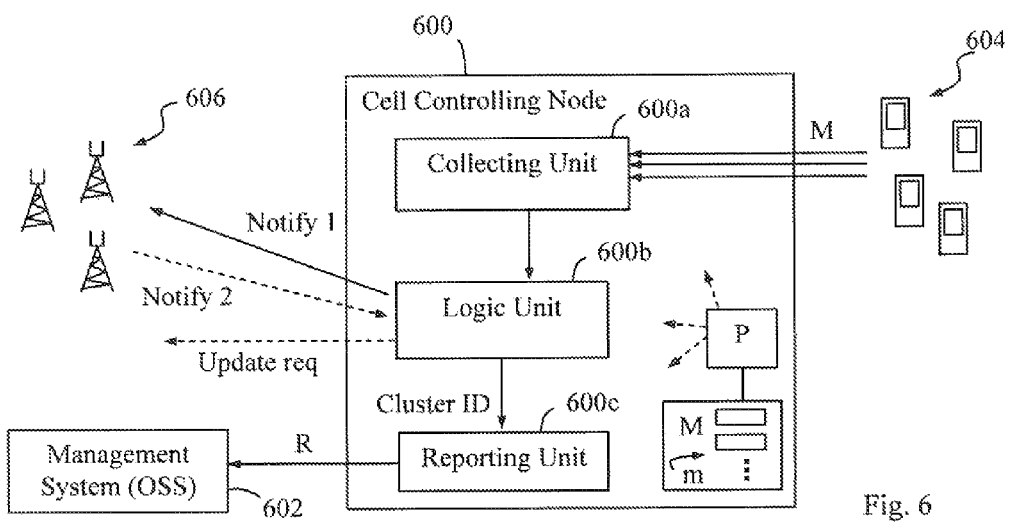
FIG. 6 is a block diagram illustrating a cell controlling node in more detail, according to further possible embodiments.

A detailed but non-limiting example of how a cell controlling node can be configured to accomplish the above-described solution, is illustrated by the block diagram in FIG. 6. The cell controlling node 600 is configured to support management of the communication network based on performance related reports sent from the cell controlling node 600 to a management system 602, e.g. according to the procedures described above for any of FIGS. 2-5, respectively. The cell controlling node 600 will now be described in terms of a possible example of employing the solution. It is assumed that cell controlling node 600 provides radio communication in a first cell of a communication network, not specifically shown here.

The cell controlling node 600 comprises a collecting unit 600a adapted to obtain signal measurements "M" from UEs 604 being served by the cell controlling node 600, on transmissions from other cell controlling nodes 606 providing radio communication in neighbouring cells. The cell controlling node 600 also comprises a logic unit 600b adapted to identify a neighbouring cell from which the measured signals fulfill a signal condition, based on the obtained signal measurements, and to select a current identity of the identified neighbouring cell as a cell cluster identity to which the first cell is associated. The cell controlling node 600 further comprises a reporting unit 600c adapted to send performance related reports "R" to the management system 602 referring to the cell cluster identity of the first cell.

The above cell controlling node 600 and its functional units 600a-c may be configured or adapted to operate according to various optional embodiments. For example, the signal condition used by the logic unit 600b for evaluating a neighbouring cell may dictate that signals from the neighbouring cell have been detected by at least a certain percentage of the UEs. Alternatively or additionally, the signal condition may dictate that a measured signal strength from the neighbouring cell exceeds a minimum level. Examples of how the signal condition may be defined were given when describing action 302 above.

In another possible embodiment, the logic unit 600b is further adapted to select the identity of the identified neighbouring cell as the cell cluster identity when the identified neighbouring cell further fulfills a cell type condition, e.g. as described for action 302c above. The cell type condition may dictate that the identified neighbouring cell should not be a micro-cell nor a pico-cell if the first cell is a macro-cell, and that the identified neighbouring cell should not be a pico-cell if the first cell is a micro-cell.

Further, the logic unit 600b may be further adapted to use the adopted cell cluster identity to replace an original identity of the first cell for the performance related reports. The logic unit 600b may be further adapted to send a notification, denoted "Notify 1", to the cell controlling nodes 606 serving the neighbouring cells, informing that the first cell controlling node has changed its identity to the cell cluster identity. Thereby, any neighbouring cell that has adopted the identity of the first cell as a cell cluster identity is able to update its cell cluster identity accordingly. Correspondingly, the logic unit 600*b* may be further adapted to receive a notification, denoted "Notify 2", from the identified neighbouring cell, informing that the identified neighbouring cell has changed its identity to a new cell cluster identity. In that case, the logic unit 600*b* can update the cell cluster identity of the first cell according to the received notification.

The logic unit 600*b* may be further adapted to send an update request, denoted "Update req", for current identities of the neighbouring cells to cell controlling nodes 606 serving the neighbouring cells after the first cell controlling node has been restarted, to determine if it is necessary to update the cell cluster identity of the first cell.

It should be noted that FIG. 6 illustrates various functional units in the base station 900 and the skilled person is able to implement these functional units in practice using suitable software and hardware. Thus, the solution is generally not limited to the shown structures of the base station 900, and the functional units 600*a-c* may be configured to operate according to any of the features described in this disclosure, where appropriate.

The functional units 600*a-c* described above can be implemented in the cell controlling node 600 by means of program modules of a respective computer program comprising code means which, when run by a processor "P" causes the cell controlling node 600 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the cell controlling node 600 in the form of a memory "M" having a computer readable medium and being connected to the processor P. The computer program product or memory M thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the cell controlling node 600.

While the solution has been described with reference to specific exemplary embodiments, the description is generally only intended to illustrate the inventive concept and should not be taken as limiting the scope of the solution. For example, the terms "cell controlling node", "management system", "cell cluster identity", "neighbouring cells" and "performance related report" have been used throughout this description, although any other corresponding nodes, systems, functions, and/or parameters could also be used having the features and characteristics described here. The solution is defined by the appended claims.

The invention claimed is:

1. A method in a first cell controlling node providing radio communication in a first cell of a communication network, for supporting management of the communication network based on performance related reports sent from the first cell controlling node to a management system, the method, performed by the first cell controlling node, comprising:
    obtaining signal measurement reports from User Equipments (UEs) being served by the first cell controlling node, on measurements performed on signals from cell controlling nodes providing radio communication in neighbouring cells,
    identifying, based on the obtained signal measurement reports, a neighbouring cell from which signals as measured by the UEs according to said reports fulfil a signal condition,
    selecting a current identity of the identified neighbouring cell as a cell cluster identity to which the first cell is associated,
    wherein the identity of said identified neighbouring cell is selected as said cell cluster identity when the identified neighbouring cell further fulfils a cell type condition dictating that the identified neighbouring cell is not a micro-cell or a pico-cell if the first cell is a macro-cell, and that the identified neighbouring cell is not a pico-cell if the first cell is a micro-cell, and
    sending performance related reports to the management system indicating the cell cluster identity.

2. The method according to claim 1, wherein said signal condition dictates that signals from the neighbouring cell have been detected by at least a certain percentage of the UEs.

3. The method according to claim 1, wherein said signal condition dictates that a measured signal strength from the neighbouring cell exceeds a minimum level.

4. The method according to claim 1, wherein the current identity of said identified neighbouring cell has been configured in the first cell controlling node to define a handover relation with the identified neighbouring cell.

5. The method according to claim 4, wherein the current identity of the identified neighbouring cell refers to any of: a Cell Global Identity (CGI), a Physical Cell Identity (PCI), and a logical name.

6. The method according to claim 1, wherein said cell cluster identity replaces an original identity of the first cell for said performance related reports.

7. The method according to claim 1, further comprising sending a notification to cell controlling nodes serving said neighbouring cells, informing that the first cell controlling node has changed its identity to the cell cluster identity.

8. The method according to claim 1, further comprising receiving a notification from the identified neighbouring cell, informing that said identified neighbouring cell has changed its identity to a new cell cluster identity, and updating the cell cluster identity of the first cell according to said notification.

9. The method according to claim 1, wherein said performance related reports include the cell cluster identity or a representation thereof.

10. A method in a first cell controlling node providing radio communication in a first cell of a communication network, for supporting management of the communication network based on performance related reports sent from the first cell controlling node to a management system, the method, performed by the first cell controlling node, comprising:
    obtaining signal measurement reports from User Equipments (UEs) being served by the first cell controlling node, on measurements performed on signals from cell controlling nodes providing radio communication in neighbouring cells,
    identifying, based on the obtained signal measurement reports, a neighbouring cell from which signals as measured by the UEs according to said reports fulfil a signal condition,
    selecting a current identity of the identified neighbouring cell as a cell cluster identity to which the first cell is associated, sending performance related reports to the management system indicating the cell cluster identity, and sending update request for current identities of said neighbouring cells to cell controlling nodes serving the neighbouring cells after the first cell controlling node has been restarted, to determine if it is necessary to update the cell cluster identity of the first cell.

11. A first cell controlling node providing radio communication in a first cell of a communication network, the first cell controlling node being configured to support management of the communication network based on performance related reports sent from the first cell controlling node to a management system, the first cell controlling node comprising a processor configured to:

obtain signal measurements from User Equipments (UEs) being served by the first cell controlling node, on transmissions from cell controlling nodes providing radio communication in neighbouring cells, identify a neighbouring cell from which the measured signals fulfill a signal condition, based on the obtained signal measurements, and to select a current identity of the identified neighbouring cell as a cell cluster identity to which the first cell is associated, select the identity of said identified neighbouring cell as said cell cluster identity when the identified neighbouring cell further fulfils a cell type condition dictating that the identified neighbouring cell is not a micro-cell or pico-cell if the first cell is a macro-cell, and that the identified neighbouring cell is not a pico-cell if the first cell is a micro-cell, and send performance related reports to the management system indicating cell cluster identity of the first cell.

12. The first cell controlling node according to claim 11, wherein said signal condition dictates that signals from the neighbouring cell have been detected by at least a certain percentage of the UEs.

13. The first cell controlling node according to claim 11, wherein said signal condition dictates that a measured signal strength from the neighbouring cell exceeds a minimum level.

14. The first cell controlling node according to claim 11, wherein the current identity of said identified neighbouring cell has been configured in the first cell controlling node to define a handover relation with the identified neighbouring cell.

15. The first cell controlling node according to claim 14, wherein the current identity of the identified neighbouring cell refers to any of: a Cell Global Identity (CGI), a Physical Cell Identity (PCI), and a logical name.

16. The first cell controlling node according to claim 11, wherein the processor is further configured to use said cell cluster identity to replace an original identity of the first cell for said performance related reports.

17. The first cell controlling node according to claim 11, wherein the processor is further configured to send a notification to cell controlling nodes serving said neighbouring cells, informing that the first cell controlling node has changed its identity to the cell cluster identity.

18. The first cell controlling node according to claim 11, wherein the processor is further configured to receive a notification from the identified neighbouring cell, informing that said identified neighbouring cell has changed its identity to a new cell cluster identity, and to update the cell cluster identity of the first cell according to said notification.

19. The first cell controlling node according to claim 11, wherein said performance related reports include the cell cluster identity or a representation thereof.

20. The first cell controlling node according to claim 11, wherein the processor is further configured to send an update request for current identities of said neighbouring cells to cell controlling nodes serving the neighbouring cells after the first cell controlling node has been restarted, to determine if it is necessary to update the cell cluster identity of the first cell.

* * * * *